US012650985B2

(12) United States Patent
Johnson et al.

(10) Patent No.: US 12,650,985 B2
(45) Date of Patent: Jun. 9, 2026

(54) TRANSFORMING STRUCTURED QUERY LANGUAGE QUERIES TO EXPEDITE QUERY EXECUTION

(71) Applicant: AT&T Intellectual Property I, L.P., Atlanta, GA (US)

(72) Inventors: Theodore Johnson, New York, NY (US); Vladislav Shkapenyuk, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 13 days.

(21) Appl. No.: 18/401,221

(22) Filed: Dec. 29, 2023

(65) Prior Publication Data

US 2025/0217362 A1    Jul. 3, 2025

(51) Int. Cl.
G06F 16/00          (2019.01)
G06F 16/2453       (2019.01)
G06F 16/2455       (2019.01)

(52) U.S. Cl.
CPC .. G06F 16/24542 (2019.01); G06F 16/24537 (2019.01); G06F 16/2455 (2019.01)

(58) Field of Classification Search
CPC .................................................. G06F 16/2455
See application file for complete search history.

(56) References Cited

U.S. PATENT DOCUMENTS

2017/0124151 A1 * 5/2017 Ji ...................... G06F 16/24542
2024/0411740 A1 * 12/2024 He ........................ G06N 3/0464

* cited by examiner

*Primary Examiner* — Ajith Jacob

(57) ABSTRACT

A method for transforming structured query language queries to expedite query execution includes detecting an explode operator in a structured query language query plan that is designed to execute a structured query language query against a database, identifying a query fragment within the structured query language query plan that starts with the explode operator and ends with a second operator, and replacing the query fragment in the structured query language query plan with an optimized query fragment in which the second operator operates directly on vectors that are a target of the second operator.

20 Claims, 3 Drawing Sheets

100

<u>200</u>

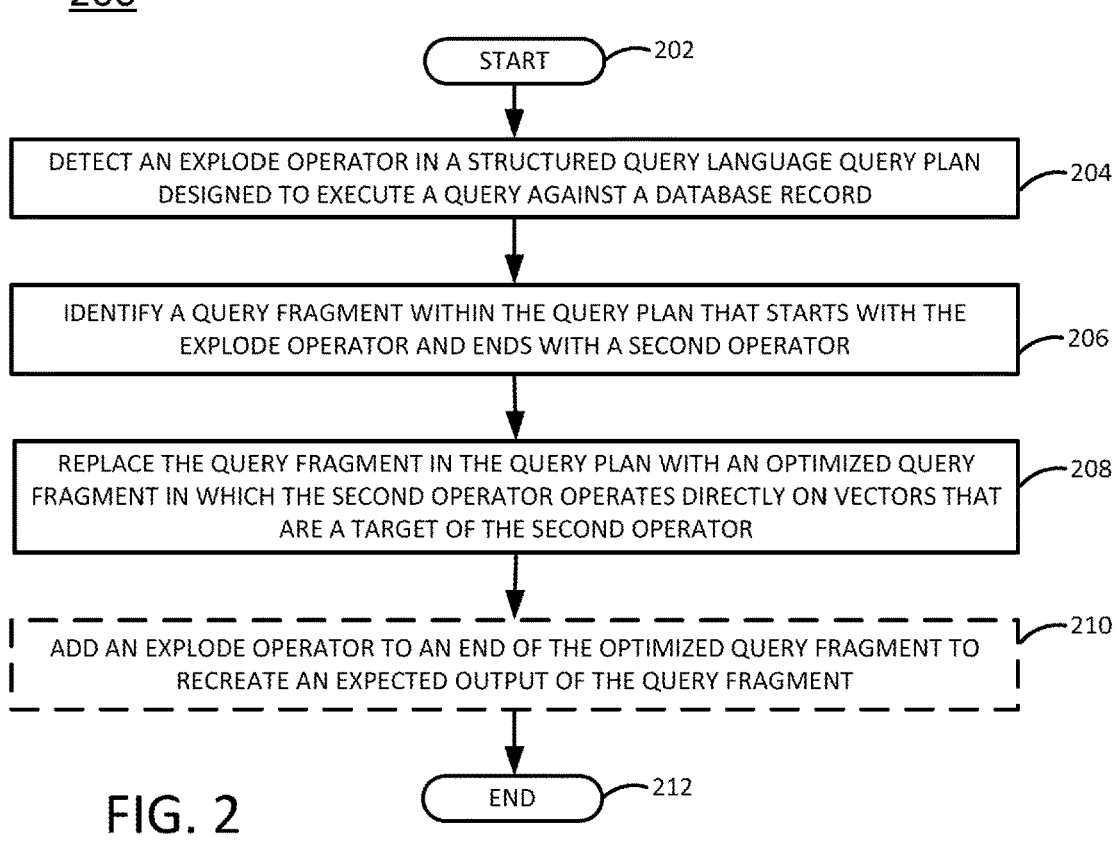

START ~202

DETECT AN EXPLODE OPERATOR IN A STRUCTURED QUERY LANGUAGE QUERY PLAN DESIGNED TO EXECUTE A QUERY AGAINST A DATABASE RECORD ~204

IDENTIFY A QUERY FRAGMENT WITHIN THE QUERY PLAN THAT STARTS WITH THE EXPLODE OPERATOR AND ENDS WITH A SECOND OPERATOR ~206

REPLACE THE QUERY FRAGMENT IN THE QUERY PLAN WITH AN OPTIMIZED QUERY FRAGMENT IN WHICH THE SECOND OPERATOR OPERATES DIRECTLY ON VECTORS THAT ARE A TARGET OF THE SECOND OPERATOR ~208

ADD AN EXPLODE OPERATOR TO AN END OF THE OPTIMIZED QUERY FRAGMENT TO RECREATE AN EXPECTED OUTPUT OF THE QUERY FRAGMENT ~210

END ~212

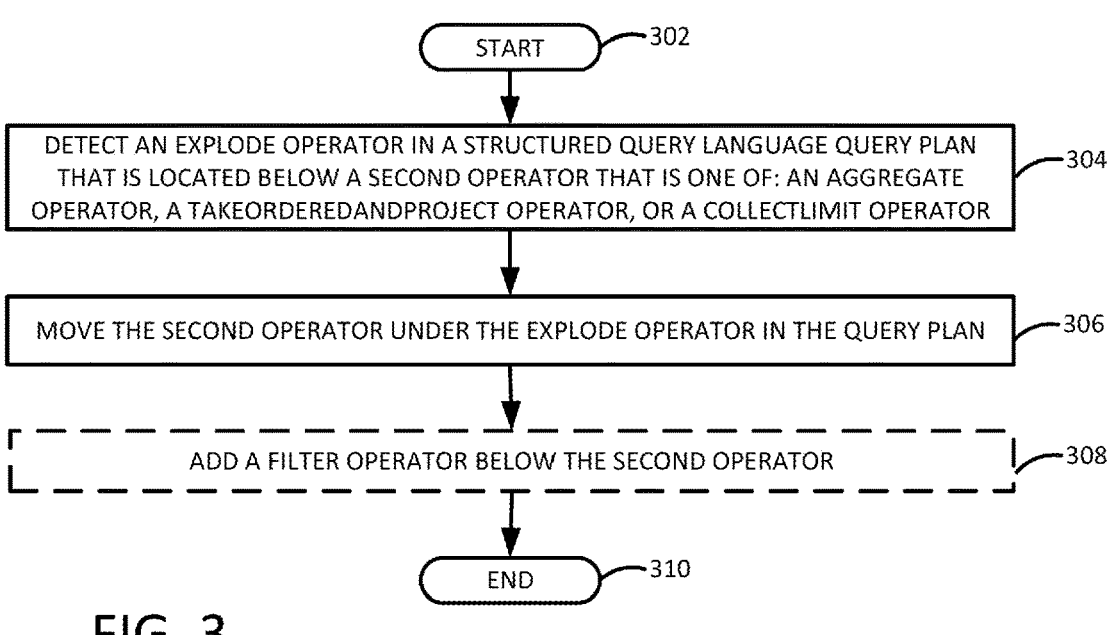

START ~302

DETECT AN EXPLODE OPERATOR IN A STRUCTURED QUERY LANGUAGE QUERY PLAN THAT IS LOCATED BELOW A SECOND OPERATOR THAT IS ONE OF: AN AGGREGATE OPERATOR, A TAKEORDEREDANDPROJECT OPERATOR, OR A COLLECTLIMIT OPERATOR ~304

MOVE THE SECOND OPERATOR UNDER THE EXPLODE OPERATOR IN THE QUERY PLAN ~306

ADD A FILTER OPERATOR BELOW THE SECOND OPERATOR ~308

END ~310

TRANSFORMING STRUCTURED QUERY LANGUAGE QUERIES TO EXPEDITE QUERY EXECUTION

The present disclosure relates generally to data management, and relates more particularly to devices, non-transitory computer-readable media, and methods for transforming structured query language queries to expedite query execution.

BACKGROUND

A relational database is a type of database that stores data in tabular form, where the rows and columns represent different data attributes and the relationships between the different data attributes. Data stored in these relational databases may be managed using structured query language (SQL), which is a programming language that is used in many applications. SQL statements may be used to store, update, remove, search, and retrieve data from a relational database.

SUMMARY

In one example, the present disclosure describes a device, computer-readable medium, and method for transforming structured query language queries to expedite query execution. For instance, in one example, a method performed by a processing system including at least one processor includes detecting an explode operator in a structured query language query plan that is designed to execute a structured query language query against a database, identifying a query fragment within the structured query language query plan that starts with the explode operator and ends with a second operator, and replacing the query fragment in the structured query language query plan with an optimized query fragment in which the second operator operates directly on vectors that are a target of the second operator.

In another example, a non-transitory computer-readable medium stores instructions which, when executed by the processing system, cause the processing system to perform operations. The operations include detecting an explode operator in a structured query language query plan that is designed to execute a structured query language query against a database, identifying a query fragment within the structured query language query plan that starts with the explode operator and ends with a second operator, and replacing the query fragment in the structured query language query plan with an optimized query fragment in which the second operator operates directly on vectors that are a target of the second operator.

In another example, a system includes a processing system including at least one processor and a non-transitory computer-readable medium storing instructions which, when executed by the processing system, cause the processing system to perform operations. The operations include detecting an explode operator in a structured query language query plan that is designed to execute a structured query language query against a database, identifying a query fragment within the structured query language query plan that starts with the explode operator and ends with a second operator, and replacing the query fragment in the structured query language query plan with an optimized query fragment in which the second operator operates directly on vectors that are a target of the second operator.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for transforming structured query language queries to expedite query execution, according to the present disclosure;

FIG. 3 illustrates a flowchart of an example method for transforming structured query language queries to expedite query execution, according to the present disclosure.

To facilitate understanding, identical reference numerals have been used, where possible, to designate identical elements that are common to the figures.

DETAILED DESCRIPTION

Figure 1:
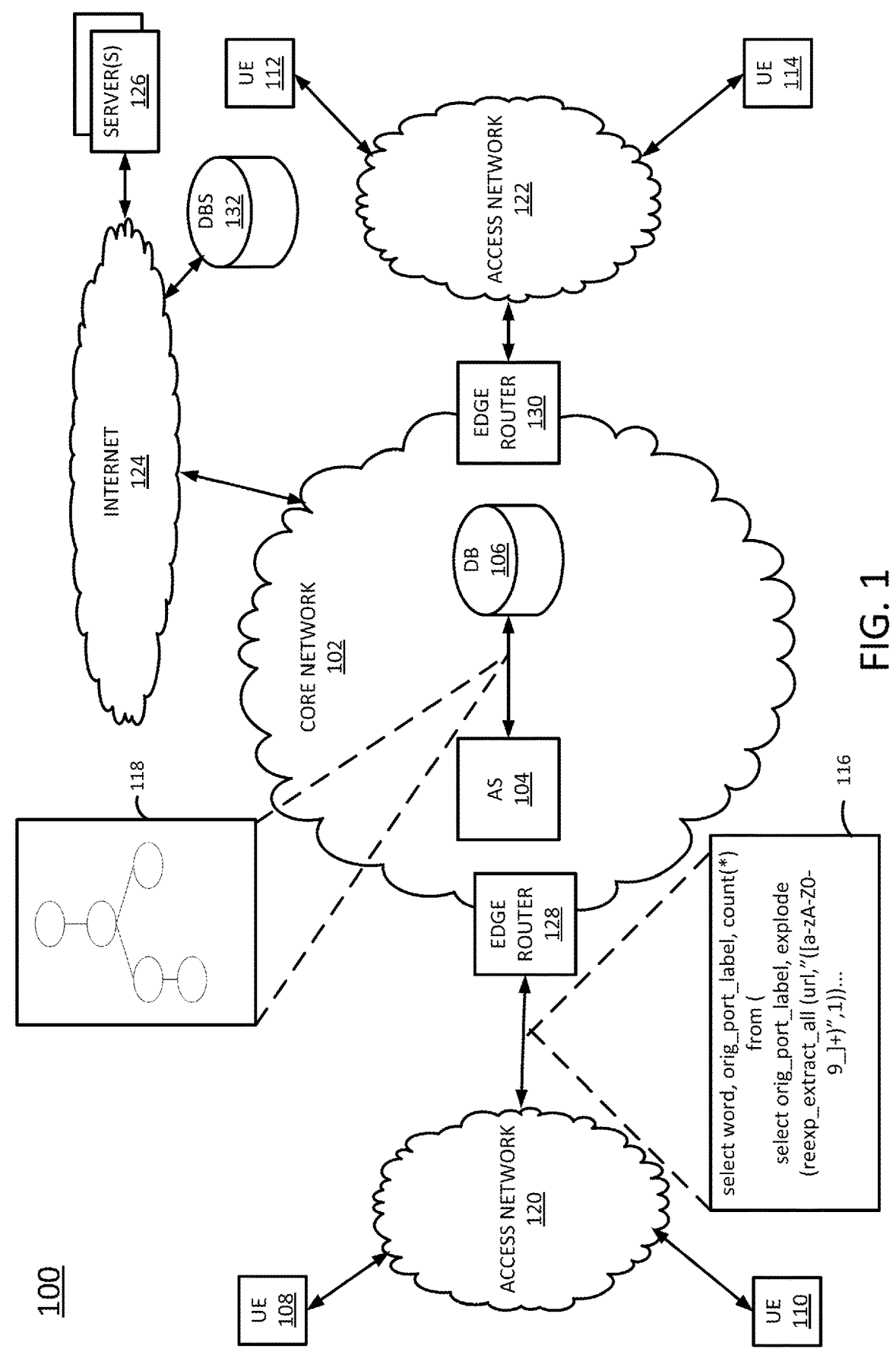
FIG. 1 illustrates an example system in which examples of the present disclosure for transforming structured query language queries to expedite query execution may operate.

In one example, the present disclosure provides a system, method, and non-transitory computer readable medium for transforming structured query language queries to expedite query execution. As discussed above, data stored in relational databases may be managed using SQL, which is a programming language that is used in many applications. SQL statements may be used to store, update, remove, search, and retrieve data from a relational database. Typically, an SQL query is executed by converting the text of the SQL query into a program comprising a sequence of operators. A query planner of database management system, in conjunction with a query optimizer, may perform this conversion.

Many datasets contained in relational databases contain fields which are arrays (or lists). For instance, Table 1, below, shows an example table in which the fields in the ts column are timestamps and the fields in the v column are arrays of vectors (values):

TABLE 1

| key | ts | v |
| --- | --- | --- |
| Foo | 1234 | [1, 2, 3, 4] |
| Bar | 1235 | [11, 12, 13] |

Conventional SQL does not readily support analyses on list fields such as the fields in the v column of Table 1, and so an "explode" operator followed by an SQL SUM aggregate operator is typically utilized to facilitate analysis. Using an explode operator allows a list field to be "exploded," so that one record is created for each element in the list, resulting in a much larger data set. For instance, executing the SQL query "Select key, ts, explode(v) as ev from t" would produce Table 2, below, as an output:

TABLE 2

| key | ts | ev |
| --- | --- | --- |
| Foo | 1234 | 1 |
| Foo | 1234 | 2 |
| Foo | 1234 | 3 |
| Foo | 1234 | 4 |

TABLE 2-continued

| key | ts | ev |
|-----|-----|-----|
| Bar | 1235 | 11 |
| Bar | 1235 | 12 |
| Bar | 1235 | 13 |

As illustrated in Table 2, executing the explode operator on vector v creates, for every entry r.v in the record r, a new record with the value of the entry as one of the fields. As a result, Table 2 is 3.5 times as big as Table 1. Thus, executing an explode operator can greatly increase the size of the data set. The increased size of the data set as a result of the explode operator increases the memory requirements (possibly even exceeding available memory) and computation time of the query. Moreover, if the query is being executed by a distributed processing system, transfer of the data set between components of the processing system may take a great deal of time due to the size of the data set.

These problems are exacerbated for especially large data sets. For instance, a mobile network operator may store a sequence of resources used at a cellular antenna as an array in the field of a database entry. The array would need to be summed to determine the total resource usage at the antenna. Using an explode operator to get access to the individual resource usage values, and then applying conventional SQL aggregate operator to sum those values, for every antenna in a mobile network, would consume a great deal of memory and computation time.

Examples of the present disclosure transform explode operators detected in SQL queries into operators that can be processed more efficiently, thereby reducing the memory and computation time required to execute the SQL queries. In one example, the transformations involve replacing explode operators in an SQL query with vector functions that allow computations to be performed on arrays in situ, with little to no memory overhead and greatly reduced computational overhead. The transformations may reduce or completely eliminate explode operators in the processing of the SQL queries. The transformations can be performed by a query optimizer component of a database management system, making the transformations transparent to the users who submitted the original SQL queries. These and other aspects of the present disclosure are discussed in further detail with reference to FIGS. 1-4, below.

To further aid in understanding the present disclosure, FIG. 1 illustrates an example system 100 in which examples of the present disclosure for transforming structured query language queries to expedite query execution may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a smart phone, a tablet computer, a laptop computer, a gaming device, a wearable smart device (e.g., a smart watch, a head mounted display, or the like), an IoT device, a bank or cluster of such devices, and the like.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. In one example, at least some of the servers 126 and DBs 132 host applications that plan, optimize, and execute SQL queries submitted by the user endpoint devices 108, 110, 112, and 114.

In accordance with the present disclosure, the AS 104 may be configured to provide one or more operations or functions in connection with examples of the present disclosure for transforming structured query language queries to expedite query execution, as described herein. For instance, in one example, the AS 104 may include at least a query planner and query optimizer that are configured to take an input SQL query and transform the input SQL query into a query plan that can be executed against a database, such as the DB 106 or the DB 132.

In one example, when the AS 104 receives an SQL query 116, the AS 104 may transform the SQL query 116 into an SQL query plan 118. An SQL query plan may comprise a sequence of operators that act on vectors (or values) contained in the fields of database records in order to produce a result that is responsive to the SQL query. Thus, for instance, the SQL query 116 may be designed to determine, for each word of a plurality of words, the total number of times that each word appeared in uniform resource locators (URLs) visited by wireless customers who "ported" or cancelled service. The SQL query plan 118 may define a set of programs or SQL operators, such as Generate, Join, Filter, CollectLimit, Aggregate, TakeOrderedAndProject, and the like, and an order in which the operators are to operate on the vectors. For instance, a first operator may need to perform an operation on the vectors to produce a first result, before a second operator can perform an operation on the result produced by the first operator. In one example, the sequence of operators may be structured as a tree, where nodes of the tree represent the different operators.

In one example, one or more of the operators in the query plan 118 may include an explode operation as discussed above. When the AS 104 detects an explode operation in the query plan 118, the AS 104 may attempt to transform at least the portion of the query plan (e.g., the query plan fragment) containing the explode operation in order to minimize the resulting increase in size of the data set being operated on. In one example, the AS 104 may be able to transform the query plan by replacing a query plan fragment that includes the explode operation and an aggregate operation (e.g., sum, median, min/max, average) with an optimized query plan fragment that allows the aggregate operation to operate directly on the vectors that the explode operation would have exploded. For instance, if the vectors are to be summed, the aggregate operator may sum the vectors directly in the array and replace the array with a single vector that represents the sum, instead of the explode operator exploding the array into a plurality of individual vectors.

In another example, the AS 104 may attempt to transform a query plan fragment by moving a second operator that is "above" (e.g., executed before) the explode operator in the query plan "below" (e.g., to be executed after) the explode operator. In one example, operators that may be moved below the explode operator may include Aggregate, CollectLimit, and TakeOrderedAndProject SQL operators. Pushing these operators below the explode operator may reduce the number of vectors in an array that is to be exploded and save unnecessary operations.

Figure 4:
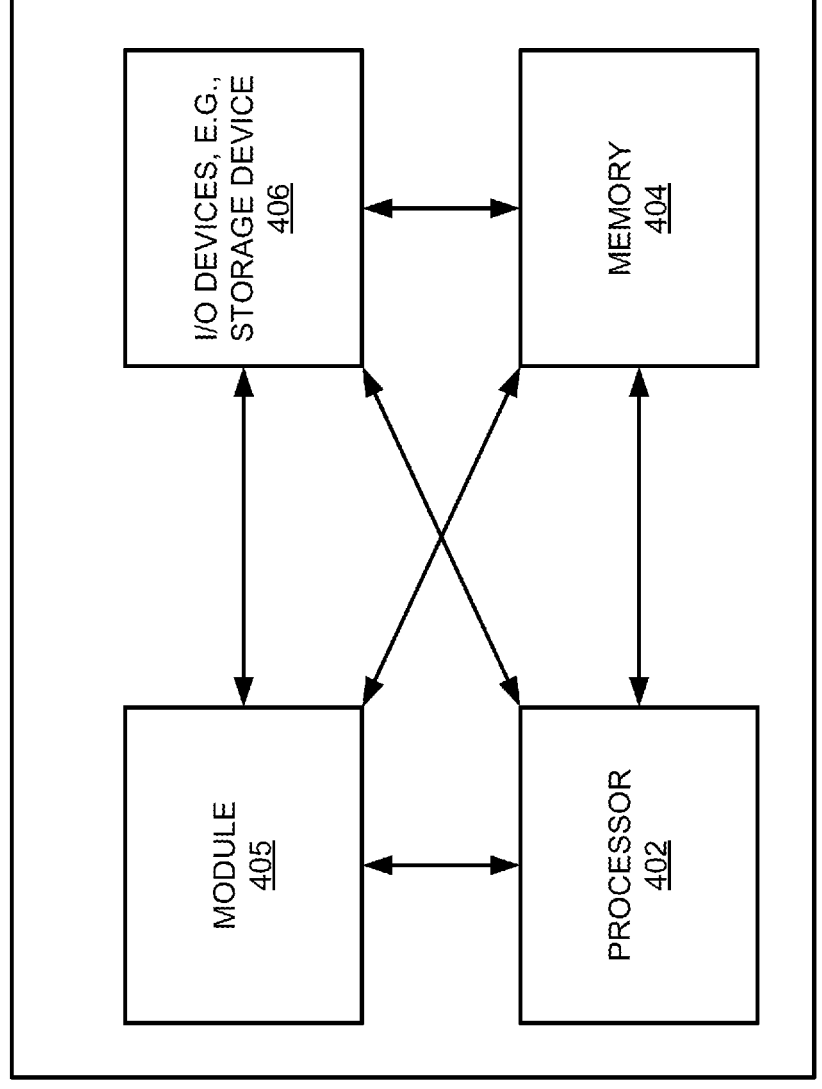
FIG. 4 depicts a high-level block diagram of a computing device specifically programmed to perform the functions described herein.

Once the AS 104 transformed and optimized a query plan for an SQL query, the optimized query plan may be executed against a database, such as DB 106 or DB 132. The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. In one example, the DB 106 may comprise a physical storage device integrated with the AS 104 (e.g., a database server or a file server), or attached or coupled to the AS 104, in accordance with the present disclosure.

In one example, the AS 104 may load instructions into a memory, or one or more distributed memory units, and execute the instructions for transforming structured query language queries to expedite query execution, as described herein. For instance, example methods for transforming structured query language queries to expedite query execution are discussed in further detail below in connection with FIG. 2 and FIG. 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

To further aid in understanding the present disclosure, FIG. 2 illustrates a flowchart of an example method 200 for transforming structured query language queries to expedite query execution. In one example, the method 200 may be performed by the AS 104 or by another element of the core network 102 illustrated in FIG. 1. However, in other examples, the method 400 may be performed by another device, such as the computing system 400 of FIG. 4, discussed in further detail below. For the sake of discussion, the method 200 is described below as being performed by a processing system (where the processing system may comprise a component of the AS 104 or by another element of the core network 102, the computing system 400, or another device).

The method 200 begins in step 202. In step 204, the processing system may detect an explode operator in a structured query language query plan that is designed to execute a query against a database.

As discussed above, an SQL query plan may comprise a program comprising a sequence of operators. The SQL query plan may be generated by an SQL query planner based on an input SQL query. For instance, the input SQL query may express an intent of the SQL query in simple terms, and the SQL query plan may define the sequence of operators needed to operate on the database in order to produce a query result that matches the intent.

In one example, the explode operator may be detected by parsing the SQL query plan for explode operators. In one example, the SQL query plan may contain no more than a single explode operator. For instance, a single explode operator might look like:

```
select k, ts, ev2, explode (v3) as ev3 from (
    select k, ts, explode (v2) as ev2, v3
    from basedf
) A;
``` where v1, v2, and v3 denote the fields in the original table that the SQL query operates on (i.e., the fields in which the vectors are contained), and ev1, ev2, and ev3 denote the fields in the exploded table corresponding to fields v1, v2, and v3, respectively.

In this case, the number of records produced per basedf record would be size(v2)*size(v3).

In another example, the structured query language query may include an explode operator that operates on a plurality of arrays. The explode operator may be aligned using a zip function, e.g., array_zip. For instance, an example zip function that is used to align an explode operator that operates on multiple arrays might look like:

```
Create temp view expl2 as
    select k, ts, ev_2_3.v2 as ev2 ev_2_3.v3 as ev3 from (
        select k, ts, explode (arrays_zip(v2, v3)) as ev_2_3
        from basedf
    ) A;
```

In this case, ev2 and ev3 are aligned and can be analyzed together. The number of records produced per basedf record would be max(size(v2), size(v3)).

In another example, the array on which the explode operation is to be performed may be an array of structures (or "structs," i.e., a way to group several related variables in one location). For instance, the array of structures may look like Struct<v2:int, v3:int, and the explode operator may look like:

select k, ts, explode(v) as ev from basedf;

In step 206, the processing system may identify a query fragment within the structured query language query plan that starts with the explode operator and ends with a second operator. In one example, a query fragment comprises a series of two or more operators of the SQL query plan (but generally less than all of the operators of the SQL query plan) that extends from a detected explode operator (which may be contained in a Generate node of the SQL query plan), through the SQL query plan, until the exploded fields are condensed back down into a smaller data set through the second operator (e.g., an aggregate operator). Put another way, the query fragment may be assumed to be a path that starts with the node of the SQL query plan containing the explode operator and ending with the node of the SQL query plan which aggregates away the exploded fields. Thus, in one example, the second operator is an aggregate operator (e.g., sum, min/max, average, median, or the like).

For instance, an example query fragment of an SQL query plan might look like:

Select k, ts, sum(ev2), median(ev3)
From expl2
Group by k, ts;

In this case, the group-by variables (i.e., k and ts) must be known to be a key of the source table or view (in this example, basedf). This may happen if the values of (k, ts) are not modified in any Select clause, and one of the following three conditions holds true: (1) k, ts is declared to be a key of basedf in the catalog; (2) k, ts is the set of group-by variables in a previous aggregation query (e.g., a deduplication query); or (3) k, ts are the partition-by fields in a window function or selection query which is equivalent to ranked deduplication.

In another example, the query fragment may extend from the detected explode operator, through the SQL query plan, until an operator is reached that cannot be transformed. In another example, the query fragment may extend until a point at which a cost optimizer rule dictates that a maximum transformation cost has been reached (in which case the query fragment must end).

In step 208, the processing system may replace (or rewrite) the query fragment in the structured query language query plan with an optimized query fragment in which the second operator operates directly on vectors that are a target of the second operator. In one example, replacing the query fragment may involve using at least one of: a filtering operation (e.g., a filter query node), a transformation operation (e.g., a project node, where any field in the output of the projection which is a transformation of an explode field may be labeled as an explode field), a join operation (where the join predicate includes the key of the foreign table and no explode field is involved in the join), or a window operation (producing aggregate values and not involving an ORDER BY clause).

In one example, where the second operator is an aggregate operator, the query fragment may be replaced with an optimized query fragment including an aggregate operation that aggregates the vectors directly (e.g., in situ) in the field. For instance, the vectors 1, 2, 3, and 4 in the array of Table 1, above, could be summed to produce a single vector of 10.

In one example, the aggregation may be performed on a single vector. An operator that involves an aggregation performed on a single vector may include a min/max (e.g., minimum and/or maximum) operator, a sum operator, an average operator, a median operator, or the like. For instance, for a min/max operator, array minimum and array maximum are built-in functions, so the replacement in this case would be simple. min(ev1) could be replaced with array_min(v1), and max(ev2) could be replaced with array_max(v2). In this case, the vectors in the database table are in the fields v1, v2, . . . , vn while the contents of these fields in an exploded table would be in the fields ev1, ev2, . . . evn.

For a sum operator, there is no built-in function to sum an array. In one example, a general purpose aggregate ( ) function can be used instead. The aggregate function may have a prototype as follows:

aggregate(vector, initial_state, lambda_update, lambda_finalize [optional]), where the first argument is the vector to be aggregated, the second argument is the initial value of an accumulator, and the third argument is a lambda function to transform the accumulator. The parameter of the lambda function is a pair (accumulator, v), where v is a value from the array. The optimized query fragment for a sum aggregate may be defined as:

$$\mathrm{sum}\ (ev1) \rightarrow \mathrm{aggregate}\ (v1, 0, (acc, x) -> acc + ifnull(x, 0))$$

where the ifnull protects against summing the null value, which would result in a null result. Other scalar values may be in the parameter of the sum as:

$$\mathrm{sum}\ (ev1 + s1) \rightarrow \mathrm{aggregate}\ (v1, 0, (acc, x) -> acc + ifnull(x + s1, 0))$$

where s1, s2, . . . , sm denotes a scalar value.

For an average operator, an average aggregate requires a pair of values, a sum, and a count in order to compute a result. The accumulator (acc) can be an array or a struct in this case, and the result may be created using a finalize function as follows:

$$\mathrm{aggregate}(v1, \mathrm{array}(0, 0),$$
$$(acc, x) -> \mathrm{array}(acc[0] + ifnull(x, 0), acc[1] + if(isnull(x), 0, 1)),$$
$$acc -> acc[0]/acc[1])$$

ifnull and the if(isnull( . . . )) functions protect against null values. Since other fields of the record can be referenced, the transform may become:

$$ag(ev1 + s1) \rightarrow \mathrm{aggregate}\ \big(\mathrm{array\_compact}\ (v1),$$
$$\mathrm{array}\ (0, 0), (acc[0] + x + s1, acc[1] + 1), acc -> acc[0]/acc[1]\big)$$

which uses the array_compact function to protect against null values.

For a median operator, the aggregate can be transformed using the array_sort function as follows:

$$\mathrm{median}\ (v1) \rightarrow \mathrm{array\_sort}\ (v1)\big[\mathrm{floor}\big(\mathrm{array\_size}\ (v1)/2\big]$$

In some examples, the query fragment may include a where clause. If the where clause follows the explode operator and does not involve any exploded column evn, then the where clause can be copied over directly. Alternatively, if there is a single exploded array in the record, and the where clause references the array, then a filter function may be used in one example to rewrite the where clause as follows:

$$\mathrm{where}\ (ev1 + s1)\%2 = 0 \rightarrow \mathrm{filter}\ (v1, x -> (x + s1)\%2 = 0)$$

In an example where the record contains more than one field which is an exploded vector, and at least one of these fields is involved in a where clause, then the where clause may be rewritten as:

$$\mathrm{where}\ (s1 + ev1)\%2 = 0 \rightarrow$$
$$\mathrm{filter}\ (\mathrm{array\_zip}(v1, v2), x -> (x[\text{``}v1\text{''}] + s1)\%2 = 0), v1\ \mathrm{as}\ v1,$$
$$\mathrm{filter}\ (\mathrm{array\_zip}(v1, v2), x -> (x[\text{``}v1\text{''}] + s1)\%2 = 0), v2\ \mathrm{as}\ v2$$

In another example, aggregation may be performed on multiple vectors, in which case the arrays may be brought together using array_zip as discussed above. In another example, the array may be an array of a struct. array_zip creates a struct, so the individual components of the struct are referenced by the array field name. One example of a sum aggregate may be rewritten as:

$$Sum(s1 + ev1 + ev2) \rightarrow \mathrm{aggregate}(\mathrm{array\_zip}(v1, v2),$$
$$0, (acc, x) -> acc + ifnull(s1 + x[\text{``}v1\text{''}] + x[\text{``}v2\text{''}], 0))$$

where an average aggregate may be written in a similar manner. If the vector is a vector of structs, the ev is also a struct, and so the sum aggregate may be rewritten as:

$$Sum(s1 + ev[\text{``}v1\text{''}] + ev[\text{``}v2\text{''}]) \rightarrow$$
$$\mathrm{aggregate}(v, 0, (acc, x) -> acc + ifnull(s1 + x[\text{``}v1\text{''}] + x[\text{``}v2\text{''}], 0))$$

A median aggregate for operating on multiple vectors would need any array of transformed values, and could be rewritten as:

$$\mathrm{medians}(s1 + ev1 + ev2) \rightarrow$$
$$\mathrm{array\_sort}(\mathrm{transform}(\mathrm{array\_zip}(v1, v2), x -> s1 + x[\text{``}v1\text{''}] + x[\text{``}v2\text{''}]))$$
$$\big[\mathrm{floor}\big(\ \mathrm{if}(\mathrm{size}(v1) > \mathrm{size}(v2), \mathrm{size}(v1), \mathrm{size}(v2))/2\big)\big]$$

In optional step 210 (illustrated in phantom), the processing system may add, after the replacing, an explode operator to an end of the optimized query fragment to recreate an expected output of the query fragment.

In one example, the increase in the size of the data set due to the explode operator that is added in step 210 is still much less than the increase that would have resulted if the query fragment had not been replaced with the optimized query fragment. That is, even though the SQL query plan may still include an explode operator if step 210 is performed, the overall memory and processing demands of SQL query plan as a whole will still be reduced.

As an example, a query plan fragment of the query fragment might read as:

```
CollectLimit (10)
+— Filter (9)
    +—Generate (8)
```

In which case the operator arguments are:

(8) Generate

Arguments: explode(split(dst_path_cable_ID , , , −1))

(9) Filter

Condition: (dst_path_cable_ID_segments=7G017/PSCGMSGA/OCSPMSGO)

If the Filter condition is not on the exploded field, then the Filter operator may be pushed below the Generate operator. In this case, the Filter condition references the exploded field, so the Filter operator cannot be pushed lower. However the vector function transform can be applied, where the query fragment comprises Generate (8) and Filter (9), but does not include the CollectLimit operator, which does not have a transform. After replacing the operators (as in accordance with step 208), the query plan fragment may read as:

CollectLimit (10)

+− Generate (8)

+−Project (11)

where the Project (11) node of the query plan applies the vector filter transformation. The Generate/explode (8) node is now adjacent to the CollectLimit (10) node, so the CollectLimit operator can be pushed below the Generate/explode (8) node.

prise a component of the AS 104 or by another element of the core network 102, the computing system 400, or another device).

The method 300 begins in step 302. In step 304, the processing system may detect an explode operator in a structured query language query plan that is located below a second operator that is at least one of: an aggregate operator, a TakeOrderedAndProject operator, or a CollectLimit operator.

As discussed above, an SQL query plan may comprise a program comprising a sequence of operators. The SQL query plan may be generated by an SQL query planner based on an input SQL query. For instance, the input SQL query may express an intent of the SQL query in simple terms, and the SQL query plan may define the sequence of operators needed to operate on the database in order to produce a query result that matches the intent. When a first operator is "located below" a second operator in the SQL query plan, this indicates that the second operator is executed before the first operator in the sequence.

In one example, the second operator is an aggregate operator. In this case, the result of the query is an aggregate function, one of the grouping variables is the field resulting from the exploder operator, and the exploded field is not referenced as a final group-by variable. An example query resulting in an aggregate function might read as:

```
select word, orig_port_label, count(*) from (
    select orig_port_label, explode(regexp_extract_all(url,"([a-zA-Z0-0_]+)", 1))
  as word
    from exl_df
  )a
Group by word, orig_port_label
```

The method 200 may end in step 212. However, it should be noted that one or more of steps 204-210 may be repeated for the same SQL query plan, if the SQL query plan includes multiple explode operators.

Thus, examples of the present disclosure replace explode operators in SQL query plans with operators that work, for as long as possible, directly on the vectors of the arrays that would be exploded. By working directly on the vectors as opposed to working on the vectors through an explode This example query might be designed to aggregate a delimited American Standard Code for Information Interchange (ASCII) list, as might be found in networking data. The delimiters in the list might comprise punctuation in a uniform resource locator (URL). The query may be designed to determine the number of times that words associated with "porting" wireless customers (i.e., customers who cancel their wireless service) appear in a set of URLs. An example query plan for the query might be structured as:

```
+-HashAggregate(keys=[word, orig_port_label],functions=[finalmerge_count(merge
count) Ascount(1)],output+[word,orig_port_label,count(1)])
    +-Exchange hashpartioniong(word, orig_port_label,200), ENSURE_REQUIREMENTS,
    [plan_id+312942]
        +-HashAggregate(keys=[word, orig_port_label], functions=[partial_count(1) AS count],
        output=[word, orig_port_label,count])
            +-Generate explode(regexp_extract_all(url, ([a-zA-Z0-9_]+), 1)), [orig_port_label],
            false,[word]
                +-Project[orig_port_label,url]
                    +-Scan ExistingRDD[srv_accs_nbr,orig_port_label,url,time_stamp]
``` operator, the size of the data set can be kept to a minimum, conserving memory, processing time, and power.

FIG. 3 illustrates a flowchart of an example method 300 for transforming structured query language queries to expedite query execution. In one example, the method 300 may be performed by the AS 104 or by another element of the core network 102 illustrated in FIG. 1. However, in other examples, the method 300 may be performed by another device, such as the computing system 400 of FIG. 4, discussed in further detail below. For the sake of discussion, the method 300 is described below as being performed by a processing system (where the processing system may com- In step 306, the processing system may move (or push) the second operator below the explode operator in the structured query language query plan. In one example, pushing the second operator "below" the second operator means that the second operator will be performed after the explode operator. This may involve further modifications to the query plan to accommodate the change in order.

As shown in the example query plan, the explode operator (as part of the generate operator) is under the aggregate operator. The explode operation is performed on a list extracted from a scalar field, and the resulting value of the explode operation is one of the group-by variables of the aggregate operator, although the exploded field (i.e., URL) is not. The aggregation function of count(*) is easily transformed by the sub/super aggregate pair of count(*) as cnt/sum(cnt) to transform the original query into:

```
select word, orig_port_label,sum(cnt) from (
    select orig_port_label, explode(regexp_extract_all(url,"([a-zA-z0-9_]+)", 1)) as
    word, count(*) as cnt
    from exl_df
    group by url
)a
group by word, orig_port_label
```

Similar operations can be performed for SQL query plans in which the explode operator is located below a TakeOrderedAndProject operator or a CollectLimit operator. For instance, an example SQL query plan fragment in which the explode operator is located below a TakeOrderedAndProject operator may read as:

TakeOrderedAndProject (20)

+−*Generate (19)

+−*Project where the details of the nodes of the SQL query plan fragment might comprise:

(19)Generate

Arguments: explode(affected_band #3570960), . . . .

(20)TakeOrderedAndProject

Arguments: 10001, [createdDatetime #3570894L DSEC NULLS LAST], . . . .

The sort argument that is part of the TakeOrderedAndProject operator does not reference the exploded field, so the sort argument can be performed before the Generate operation. The SQL query plan fragment could thus be transformed to read:

CollectLimit (21)

+−*Generate (19)

+−*TakeOrderedAndProject (20)

+−Filter (22)

+−Project (18)

The parameter of Filter (22) in the transformed SQL query plan is size(affected_bans)>0, and the parameter of CollectLimit is 10001. This transformation sorts a smaller, unexploded data set, and the Generate operator creates a smaller table as compared to the original query plan fragment.

In this transformation, the explode operation occurs immediately before the CollectLimit operator, but the transformation ensures that the sort order is not affected and that at least 10001 records are available (if the original query plan fragment produced that many records). Additional operators may be inserted between the Generate (explode) operator and the TakeOrderedAndProject or CollectLimit operators, as long as the additional operators do not affect the sort order or eliminate any records. For instance, an additional Project operator that performs calculations or a window function can be inserted between the Generate operator and the TakeOrderedAndProject operator.

In optional step 308 (illustrated in phantom), the processing system may add a filter operator to the structured query language query plan. In one example, a filter operator may be added when the second operator is a TakeOrderedAndProject operator or a CollectLimit operator. A filter predicate may be broken into a plurality of sub-predicates, where each sub-predicate falls into one of the following two classes: (1) references an explode field; or (2) does not reference an explode field. Predicates which do not reference an explode field may be placed in a Filter node in the SQL query plan. Predicates which do reference an explode field may be placed in a Project node of the SQL query plan. The filter operator may discard arrays in the data set that are empty. The method 300 may end in step 310.

The method 300 may be performed separately from the method 200 or in combination with the method 200 in order to further optimize an SQL query plan. As with the method 200, steps of the method 300 (e.g., steps 304-308) may be repeated for the same SQL query plan, if the SQL query plan includes multiple explode operators.

Although not expressly specified above, one or more steps of the method 200 or method 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 and FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or method 300 may be implemented as the system 400. For instance, the AS 104 of FIG. 1 (such as might be used to perform the method 200 or the method 300) could be implemented as illustrated in FIG. 4. As depicted in FIG. 4, the system 400 comprises a hardware processor element 402, a memory 404, a module 405 for transforming structured query language queries to expedite query execution, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for transforming structured query language queries to expedite query execution may include circuitry and/or logic for performing special purpose functions relating to optimizing query plans for SQL queries. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for transforming structured query language queries to expedite query execution can be loaded into memory 404 and executed by hardware processor element 402 to implement the steps, functions or operations as discussed above in connection with the example method 200 or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for transforming structured query language queries to expedite query execution (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

detecting, by a processing system including at least one processor, an explode operator in a structured query language query plan that is designed to execute a structured query language query against a database, wherein the database stores a dataset containing at least one field that is an array of vectors;

identifying, by the processing system, a query fragment within the structured query language query plan that starts with the explode operator and ends with a second operator that aggregates away a plurality of explode fields generated from the array of vectors by the explode operator; and replacing, by the processing system, the query fragment in the structured query language query plan with an optimized query fragment in which the second operator operates directly on the array of vectors so that computations associated with the second operator are performed on the array of vectors in situ in the at least one field, without generating the plurality of explode fields.

2. The method of claim 1, wherein the second operator is an aggregate operator.

3. The method of claim 2, wherein the aggregate operator performs one of: a sum operation, a minimum operation, a maximum operation, an average operation, or a media operation.

4. The method of claim 1, wherein the second operator operates directly on the array of vectors without exploding the array that contains the vectors.

5. The method of claim 1, wherein the second operator utilizes at least one of: a filtering operation, a transformation operation, a join operation, or a window operation.

6. The method of claim 1, further comprising:

adding, by the processing system after the replacing, an explode operator to an end of the optimized query fragment to recreate an expected output of the query fragment.

7. The method of claim 1, further comprising:

detecting, by the processing system, another explode operator in the structured query language query plan that is located below another operator in the structured query language query plan that is one of: an aggregate operator, a takeorderedandproject operator, or a collectlimit operator.

8. The method of claim 7, further comprising:

moving, by the processing system, the another operator under the another explode operator in the structured query language query plan.

9. The method of claim 8, wherein the another operator is an aggregate operator, a grouping variable of the aggregate operator is a field of a data set that the structured query language query plan is to be executed against that results from the another explode operator, and an exploded field of the data set is not referenced as a final group-by variable of the aggregate operator.

10. The method of claim 8, wherein the another operator is a takeorderedandproject operator or a collectlimit operator, and the method further comprises:

adding, by the processing system, a filter operator to the structured query language query plan.

11. The method of claim 10, wherein the filter operator discards empty arrays of a data set that the structured query language query plan is to be executed against.

12. The method of claim 1, wherein the processing system is part of a query planner or a query optimizer of a relational database management system.

13. A non-transitory computer-readable medium storing instructions which, when executed by a processing system including at least one processor, cause the processing system to perform operations, the operations comprising:

detecting an explode operator in a structured query language query plan that is designed to execute a structured query language query against a database, wherein the database stores a dataset containing at least one field that is an array of vectors;

identifying a query fragment within the structured query language query plan that starts with the explode operator and ends with a second operator that aggregates away a plurality of explode fields generated from the array of vectors by the explode operator; and replacing the query fragment in the structured query language query plan with an optimized query fragment in which the second operator operates directly on the array of vectors so that computations associated with the second operator are performed on the array of vectors in situ in the at least one field, without generating the plurality of explode fields.

14. The non-transitory computer-readable medium of claim 13, wherein the second operator is an aggregate operator.

15. The non-transitory computer-readable medium of claim 14, wherein the second operator operates directly on the array of vectors without exploding the array that contains the vectors.

16. The non-transitory computer-readable medium of claim 13, the operations further comprising:

adding, after the replacing, an explode operator to an end of the optimized query fragment to recreate an expected output of the query fragment.

17. The non-transitory computer-readable medium of claim 13, the operations further comprising:

detecting another explode operator in the structured query language query plan that is located below another operator in the structured query language query plan that is one of: an aggregate operator, a takeorderedandproject operator, or a collectlimit operator; and moving the another operator under the another explode operator in the structured query language query plan.

18. The non-transitory computer-readable medium of claim 17, wherein the another operator is an aggregate operator, a grouping variable of the aggregate operator is a field of a data set that the structured query language query plan is to be executed against that results from the another explode operator, and an exploded field of the data set is not referenced as a final group-by variable of the aggregate operator.

19. A system comprising:

a processing system including at least one processor; and a non-transitory computer-readable medium storing instructions which, when executed by the processing system, cause the processing system to perform operations, the operations comprising:

detecting an explode operator in a structured query language query plan that is designed to execute a structured query language query against a database, wherein the database stores a dataset containing at least one field that is an array of vectors;

identifying a query fragment within the structured query language query plan that starts with the explode operator and ends with a second operator that aggregates away a plurality of explode fields generated from the array of vectors by the explode operator; and replacing the query fragment in the structured query language query plan with an optimized query fragment in which the second operator operates directly on the array of vectors so that computations associated with the second operator are performed on the array of vectors in situ in the at least one field, without generating the plurality of explode fields.

20. The method of claim 1, wherein the structured query language query plan contains a plurality of operators including the explode operator, the second operator, and at least a third operator, and the query fragment contains fewer than all of the plurality of operators.

*    *    *    *    *